United States Patent
Damhuis et al.

(10) Patent No.: US 9,668,509 B2
(45) Date of Patent: Jun. 6, 2017

(54) RETORT AGITATION SYSTEM

(71) Applicant: John Bean Technologies Corporation, Chicago, IL (US)

(72) Inventors: Eduard Hendrikus Johannes Damhuis, Bousval (BE); Bart Aluwé, Nieuwkerken-Waas (BE)

(73) Assignee: John Bean Technologies Corporation, Chicago, IL (US)

(*) Notice: Subject to any disclaimer, the term of this patent is extended or adjusted under 35 U.S.C. 154(b) by 528 days.

(21) Appl. No.: 14/214,997

(22) Filed: Mar. 16, 2014

(65) Prior Publication Data

US 2015/0257429 A1  Sep. 17, 2015

(51) Int. Cl.
| | |
|---|---|
| A23L 3/00 | (2006.01) |
| B65B 55/02 | (2006.01) |
| A23L 3/02 | (2006.01) |
| A23L 3/14 | (2006.01) |

(52) U.S. Cl.
CPC ............... *A23L 3/001* (2013.01); *A23L 3/14* (2013.01); *B65B 55/025* (2013.01)

(58) Field of Classification Search
CPC . A23L 3/001; A23L 3/003; A23L 3/02; A23L 3/10; A23L 3/14; B65B 55/025; A61L 2/02; A61L 2/04
USPC ........ 422/1, 26, 38, 307, 297, 300; 426/405; 99/371; 366/212, 240
See application file for complete search history.

(56) References Cited

U.S. PATENT DOCUMENTS

| | | | |
|---|---|---|---|
| 4,170,421 A * | 10/1979 | Balding .................... | A61L 2/07 422/297 |
| 4,179,986 A | 12/1979 | Mencacci | |
| 5,857,312 A | 1/1999 | Walden | |
| 7,966,929 B2 | 6/2011 | Walden | |
| 8,394,335 B2 | 3/2013 | Greve | |
| 2009/0311131 A1 | 12/2009 | Tago | |
| 2010/0139501 A1 | 6/2010 | Cordes | |
| 2010/0272620 A1 | 10/2010 | Greve | |

FOREIGN PATENT DOCUMENTS

GB    2 446 154 A    8/2008

OTHER PUBLICATIONS

International Search Report and Written Opinion mailed Jun. 1, 2015, issued in corresponding International Application No. PCT/US2015/019854, filed Mar. 11, 2015, 9 pages.

* cited by examiner

*Primary Examiner* — Jill Warden
*Assistant Examiner* — Julie Tavares
(74) *Attorney, Agent, or Firm* — Christensen O'Connor Johnson Kindness PLLC

(57) ABSTRACT

A retort agitation system (100) for thermal processing of products includes product carriers 102a and 102b mounted on a low friction support system 104 for reciprocal movement of the carriers along the interior of a retort. The product carriers are driven in reciprocating motion by a drive actuator system 106 that can be positioned between the carriers 102a and 102b or endwise of the two carriers 102a and 102b. A drive actuator system 106 is linked to the carriers to cause the carriers to move along opposite reciprocating paths lengthwise of the retort. Reaction actuators 108 act on the carriers in opposition to the drive actuator system 106 to apply forces on the carriers for accelerating the carriers along the reciprocating paths of travel when such carriers reach the distal and proximal ends of the reciprocating travel paths.

22 Claims, 14 Drawing Sheets

*(90° POSITION)*

*(TOP DEAD CENTER)*

*(BOTTOM DEAD CENTER)*

RETORT AGITATION SYSTEM

FIELD OF THE INVENTION

The present invention relates to retort systems for in-container preservation of foodstuffs, and more particularly to a system and method for processing foodstuffs in a retort wherein the foodstuffs are agitated during thermal processing.

BACKGROUND

Retorts have been widely used for in-container preservation of foodstuffs, either for pasteurization or sterilization processes. A retort generally includes a pressure vessel for receiving containers containing foodstuffs arranged on trays or baskets that are stacked on pallets or other types of carrier structures. The sterilization/pasteurization of the food products can occur by applying heating media to the food product containers, including, for example, super-heated steam or hot water. Such heating media can be applied by spraying onto the stacked containers. Alternatively, the heating media can be introduced into the retort vessel to immerse the containers holding the foodstuffs.

Rather than utilizing a static system wherein the containers are held stationary within the retort vessel during pasteurization or sterilization, an agitating retort can be employed. Agitation of the food products during pasteurization/sterilization in a retort can result in a shorter processing time and improve the quality and presentation of the food product. Semi-convective products and those containing particulates especially benefit from agitation. The improvement in the presentation of the food product stems in part from a lower thermal load or burden having to be applied to the food product to accomplish the required level of pasteurization or sterilization.

The agitation of food products in a retort has been accomplished by different systems. In one system the pallets/carriers of foodstuff containers are loaded within a drum positioned within the retort vessel. The drum is rotated about its longitudinal axis to produce end-over-end agitation of the food product. Although end-over-end agitation is quite effective, it does require a drive system to rotate the drum as well as a support structure for the drum during rotation within the retort, as well as systems for introducing the processing fluid into the rotating drum.

Another type of agitation retort relies on linear agitation of the food product. By moving the food product back-and-forth over a relatively short distance within the retort, the change in direction at the end points of the back and forth travel results in deceleration and acceleration forces in the containers that induce an agitation effect on its content. The effect of linear agitation is less than that achievable by end-over-end agitation; however, in many cases such "light agitation" can sufficiently reduce the processing time and/or avoid clumping of the product, to be warranted relative to simply static thermal processing of the food product.

A typical linear agitation system includes the drive mechanism consisting of a crankshaft rotated by a motor. Both the crankshaft and motor are located outside one end of the retort. A connecting rod system connects a crankshaft to the retort pallet/carrier. Relatively heavy duty drive systems are required in these types of linear agitation systems, including the need to counterbalance and smooth out the forces applied to the food product by the rotating crankshaft. This counterbalancing is typically accomplished through the use of one or more flywheels.

Linear agitation of food products within a retort with a crank mechanism located outside of the retort results in sinusoidal movement of the food product. In this regard, the maximum acceleration or deceleration is achieved at only two points during rotation of the crank mechanism. Acceleration of the food product is defined by the formula: $\omega^2 * R * \sin(\alpha)$. In this equation, $\omega$ equals the rotational speed (in rad/s); R is the crank radius (meters); and $\alpha$ is the rotational angle (rad).

To achieve higher acceleration for a given crankshaft radius, the rotational speed of the crankshaft needs to be increased. For instance, for a crankshaft radius of R=0.075 m, to achieve an acceleration of 0.4 g (4 m/s$^2$), a rotational speed of 7.30 rad/seconds or 69.7 revolutions per minute (RPM) is required. A challenge in linear agitating systems is to achieve a sufficiently high acceleration of the food product, but at the same time limiting the number of revolutions or cycles per minute of the crankshaft mechanism and also minimizing the amount of energy consumed. As noted above, typically in linear agitation systems, a flywheel is needed to store the kinetic energy of the moving mass within the agitating retort.

The present disclosure seeks to address the drawbacks of existing linear agitating systems by providing an inherently balanced linear agitating system accomplished by moving food product sets in opposite reciprocating directions to each other and requiring modest operating energy.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system is provided for agitating products in a processing retort. The system includes first and second product carrier sets. The carrier sets are supported on a low friction support system for movement along the interior of the retort. A drive actuator system applies reciprocating forces on the product carrier sets for reciprocal movement of the product carrier sets in simultaneous opposite directions to each other along the retort. Also, reaction actuators apply reaction forces against the product carrier sets in opposition to the reciprocal movement of the product carrier sets by the drive actuator system thereby to urge the product carrier sets to move along the retort in directions opposite to the reciprocal movement imposed on the product carrier sets by the drive actuator system.

The drive actuator system includes a rotary crank drive and connection linkages that extend between the rotary crank drive and the product carrier sets. The rotary crank drive itself includes a crankshaft and a torque source to supply rotational torque to the crankshaft. An over-running clutch is interposed between the torque source and the crankshaft to allow the crankshaft to move or rotate faster than the rotation of the torque source, including when the product carrier sets are accelerated by the reaction forces imposed thereon by the reaction actuators. A control system may be used to control the speed of the torque source applied to the crankshaft so that the torque source supplies energy to the system to compensate for the energy lost by friction on the system, but not so much torque that the system operates at a speed out of control.

The product carrier sets may be composed of individual product carriers that are spaced apart from each other, each of the product carriers can include a tray structure or basket for receiving products to be processed. Additional product carriers can be linked to the product carriers of the sets so that each set is composed of several product carriers.

The drive actuator system can be positioned in various locations relative to the retort vessel. For example, the drive actuator system can be positioned between the product carrier sets. In this regard, components of a drive actuator system may be located within the retort vessels. Alternatively, two separate retort vessels may be used with one product carrier set in each retort vessel, and the drive actuator system may be positioned between the two retort vessels. In another configuration, the drive actuator system can be positioned at the end of the retort vessel with connecting links connecting the drive actuator system with the product carrier sets.

The reaction actuator system can be designed to apply a substantially constant force against the product carriers as the product carriers travel towards the ends of their reciprocal paths of travel. Alternatively, the reaction actuator system can apply an increasing force or even a decreasing force to the product carrier sets as the product carriers reach the ends of their reciprocal paths of travel. The reaction actuator systems can be of various configurations, including, for example, compression springs, extension springs, torsion springs, coil springs, helical springs, gas springs, pneumatic springs, and elastic bands.

A method of agitating products in a retort is provided, which includes arranging the products in two sets for movement along the interior of the retort, and applying reciprocating forces on the two spaced-apart product sets for reciprocating movement of the product sets in opposite directions relative to each other along the retort. A reaction force is applied to the product sets for acting against the reciprocating movement of the product sets. The reaction force capable of moving the product sets in a direction opposite to the direction of movement of the product sets under the influence of the reciprocating forces.

In accordance with the present method, the product sets move along reciprocal paths between a proximal location and a distal location. Further, the reaction forces acting on the product sets in a direction opposite to the direction of movement to the product sets under the influence of the reciprocating forces as the product sets reach the proximal locations and distal locations along the reciprocal travel paths.

In a further aspect of the present invention, the reciprocating forces are applied to the product sets from a location between the product sets or from a location endwise of the product sets. Such reciprocating force can be applied to the product sets by a rotational crank drive system. The rotational crank drive system can include an over-running clutch system to permit the product sets to move under the influence of the reaction force at a speed faster than the speed of movement of the product sets acting under the reciprocal force applied to the product sets by the rotatable crank drive system.

As a further aspect of the present method, the speed at which the reciprocating forces are applied to the product sets can be controlled.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
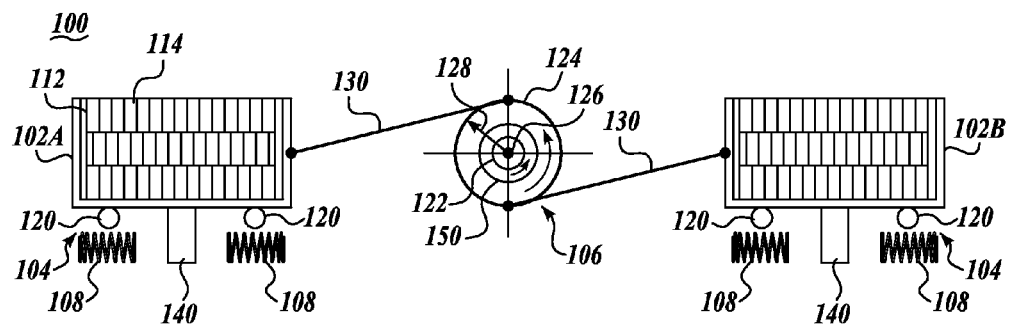
FIG. 1 is a schematic view of one embodiment of the present disclosure showing the product carriers halfway between the ends of their reciprocal paths and showing the drive actuator system midway between a dead center location.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "distal," "proximal." "upward," "downward," "right hand," left hand," "in," "out," "extended," "advanced," and "retracted." These references and other similar or corresponding references in the present application are only to assist in helping describe and understand the present disclosure and are not intended to limit the present disclosure to these directions.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus and units are the same or similar are not repeated so as to avoid redundancy in the present application.

FIGS. 1-10 schematically illustrate one embodiment of the present disclosure, wherein a linear reciprocating system 100 usable in a thermal processing retort includes product carriers 102a and 102b mounted on a low friction support system 104 for reciprocal movement along the interior of the retort (hereinafter the carriers may also be simply referred to by the part number 102). The product carriers 102 are driven in reciprocating motion by a drive actuator system 106 which is illustrated as positioned between the two carriers 102a and 102b. The drive actuator system is linked to the carriers 102a, 102b to cause the carriers to move along opposite reciprocating paths lengthwise of the retort. Reaction actuators 108 act on the carriers 102a, 102b in opposition to the drive actuator system to apply force on the carriers 102a, 102b for accelerating the carriers along their reciprocating paths when such carriers reach the distal and proximal ends of their reciprocating paths, as described more fully below.

To describe the present system and method in more detail, as shown in FIGS. 1-9, the carriers 102a, 102b are adapted to receive baskets or trays 112 therein which are stacked on the carriers 102a and 102b. Individual product containers 114 are arranged on the baskets/trays in a well-known manner.

It will be appreciated that FIGS. 1-9 do not show the details of a typical retort, including the retort vessel itself, nor the system for introducing the heating medium into the retort or for removing and/or recirculating the heating medium. These aspects of retort vessels are known to those familiar with retort design and technology. Different heating media and delivery systems can be utilized, including spraying saturated superheated steam onto the product containers or filling the interior of the retort with hot water, for example.

The carriers 102 are supported for substantially low friction movement along the interior of the retort. This can be accomplished by different means. For example, rollers 120 can be axled to the underside of carriers 102a, 102b. Appropriate bearings can be interposed between the rollers and their axles to minimize the rotational friction on the rollers. Alternatively, rollers, such as rollers 120, can be mounted at in the lower section of the agitating retort to support and bear against the underside of the carriers 102a, 102b in a known manner. Rather than relying on rollers 120, balls in the form of ball bearings can be used in place of rollers 120. The ball bearings can be mounted in the floor structure of the retort vessel.

The carriers 102a, 102b are linked to drive actuator system 106, which is positioned between the carriers 102a and 102b. The drive actuator system 106 in the schematically illustrated form, includes a drive shaft 122 which is connectable to a torque source, such as a motor, for rotating the drive shaft. The drive shaft 122 is connected to a double-throw crankshaft 124, rotatable about axis 126 by rotation of the drive shaft 122. The crankshaft 124 has a throw 128 corresponding to the distance between the rotational axis 126 and the radial location that connecting links 130 and is attached to the crankshaft. The opposite end of the connecting links 130 and 132 are coupled to carriers 102a and 102b. A speed control system may be provided for controlling the rotational speed of the drive shaft 122. Also although not specifically shown, the crankshaft 124 can be constructed to have a variable throw, thereby to alter the length of the reciprocal path of travel of the carriers 102a, 102b along the retort.

The drive motor for the drive shaft 122 can be located outside of the retort vessel, with the drive shaft 122 leading from the exterior motor to the crankshaft 122 within the vessel. Also, as is standard, the drive shaft can be composed of one or more sections, and an appropriate gear or other type of speed reducer can be interposed between the motor and the crankshaft 120. Rather than being positioned externally to the retort vessel, the drive motor can be located within the retort vessel, and appropriately sealed from the heating medium of the retort vessel.

The reaction actuators 108 are positioned to bear against the carriers as the carriers approach the distal and proximal ends of travel along their opposing reciprocal paths. The kinetic energy of the carriers is transferred to and stored by the reaction actuators as the carriers press against the reaction carriers. The reaction actuators can be configured to apply an increasing level of the reaction or resistance force against the carriers with continued travel of the carriers toward the ends of their travel paths. Alternatively, the reaction actuators can be configured to apply a constant level of force against moving carriers. The reaction actuators can take numerous forms. For example, the reaction actuators can be composed of compression springs, extension springs, torsion springs, coil springs, and helical springs. As an alternative, the reaction actuators can be composed of extendible elastic bands. Further alternatively, the reaction actuators can be composed of gas springs or pneumatic springs or a combination of gas/pneumatic springs and compression springs, for example. If compression springs are used for the reaction actuators, they can be pre-compressed to apply a desired resistance load against the carriers as soon as the carriers bear against the reaction actuators.

The reaction actuators are shown as bearing against an abutment 140 depending downwardly from the underside of the carriers 102a, 102b. Of course, the reaction actuators 108 can instead bear against other portions of the carriers 102a and 102b.

Figure 10:
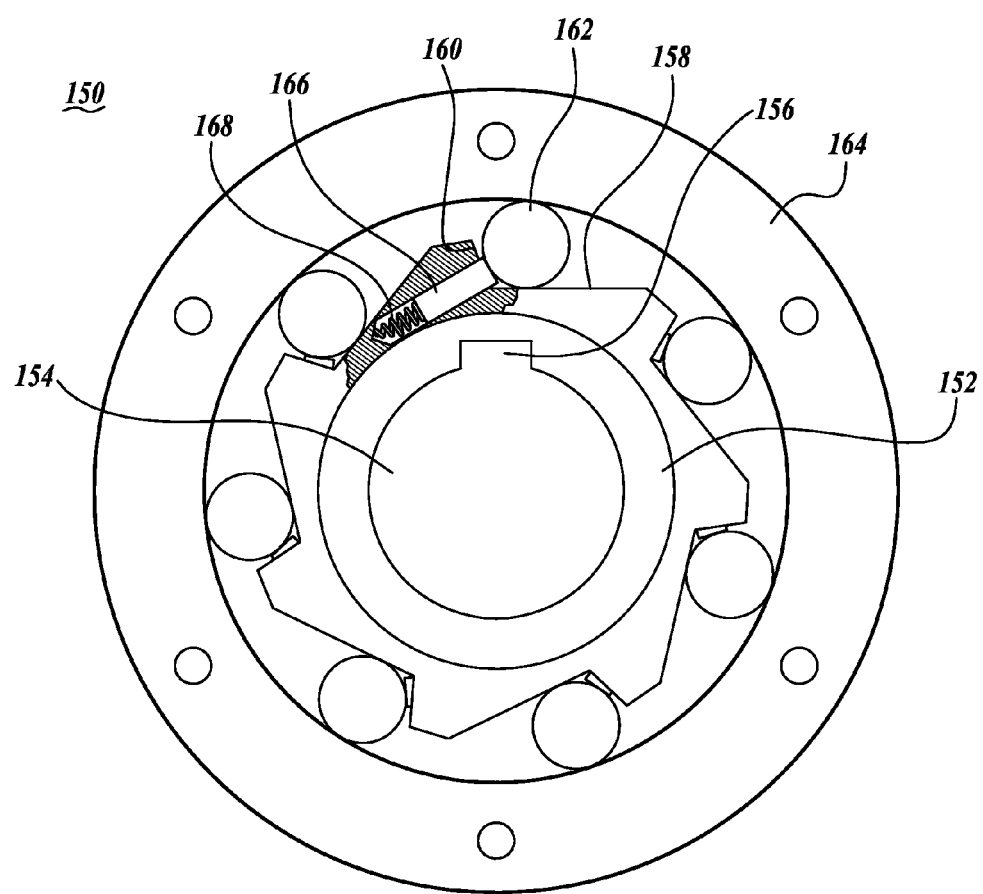
FIG. 10 is a cross-sectional view of a portion of an overrunning clutch.

FIG. 10 illustrates an overrunning clutch 150 that is interposed between the drive shaft 122 and the crankshaft 124, thereby to enable the crankshaft to rotate faster in one direction, i.e., "overrun," the drive shaft. As explained below, this typically will occur when the carriers 102a, 102b reach the end of their travel and are rapidly accelerated for movement in the opposite direction by the reaction actuators 108. The overrunning clutch 150 includes a central or inner race 152 having a central hollow through bore 154 for engaging over the drive shaft 122. A longitudinal groove 156 can be formed in the perimeter inner race 152 for receiving a key that also engages within a keyway formed in the drive shaft 122. Alternatively, the drive shaft 122 can be constructed with a spine that engages within the groove 156, thereby to transfer rotational torque between the drive shaft and the inner race 152.

A series of shoulders or ramps 158 are formed in the outer perimeter of the inner race 152 to extend tangentially, radially and outwardly from the rotational center of the inner race 152. An abutment 160 is provided at the base of the ramps 158, which serves as a backstop for bearings 162 disposed between the ramps 158 and the interior diameter of the clutch outer race 164. Spring-loaded plungers 166 engage within the blind bore formed in the inner race 152 to bear against the portion of the bearings 162 facing abutments 160, thereby to normally load or urge the bearings 162 outwardly relative to the shoulders 158. Compression springs 168 are located between the bottom of the blind bore in the inner race and the adjacent inward end of the plungers 166 thereby to urge the plungers outwardly against the bearings 162.

The outer race 164 is anti-rotationally coupled to the crankshaft 124 in a known manner. The overrunning clutch 150 operates in a typical manner wherein if the outer race rotates at a speed faster than the rotational speed of the drive shaft, the ball bearings 162 move toward abutments 160, thereby providing slippage or clearance between the bearings and the inside diameter of the outer race, permitting the outer race to rotate faster than the inner race, which is rotating at the speed of the drive shaft. On the other hand, if the inner race is rotating at a speed faster than the speed of the outer race, the ball bearings 162 ride outwardly on ramps 158, thereby to wedge against the inside diameter of the outer race, whereby the outer race rotates with the inner race at the speed of rotation of the drive shaft.

Next describing the operation of the linear agitation system 100 shown in FIGS. 1-9, referring initially to FIG. 1, the carriers 102a, 102b are shown at the midpoints of their reciprocal paths. At this location of the carriers, the crankshaft 124 is also at its midpoint position, with the connecting link 130 of carrier 102a connected to the drive shaft at the "twelve o'clock" position and the connecting link 130 of carrier 102b connected to the crankshaft at the "six o'clock" position. FIG. 1 could be viewed as the "startup" position of system 100.

Figure 2:
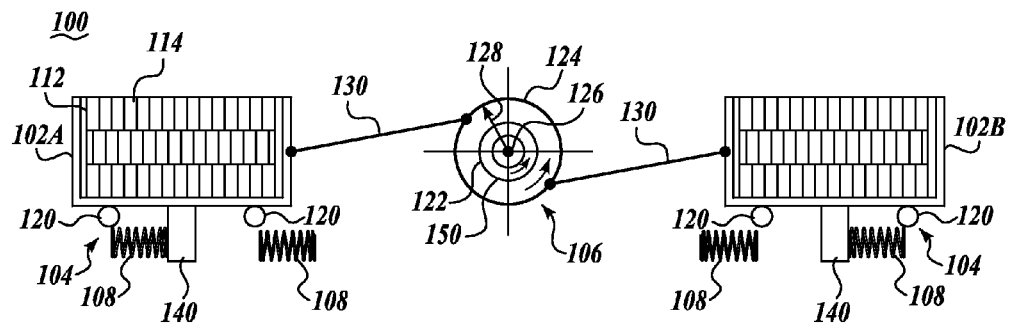
FIG. 2 is similar to FIG. 1, but with the drive actuator system rotated approximately 45° counterclockwise from FIG. 1.

Next, referring to FIG. 2, the crankshaft 128 is shown as rotated approximately 30°, wherein the carriers 102a, 102b have moved toward their distal locations of their reciprocal paths whereupon the reaction actuators 128 are shown as initially abutting against or pressing against the carriers 102a, 102b.

Figure 3:
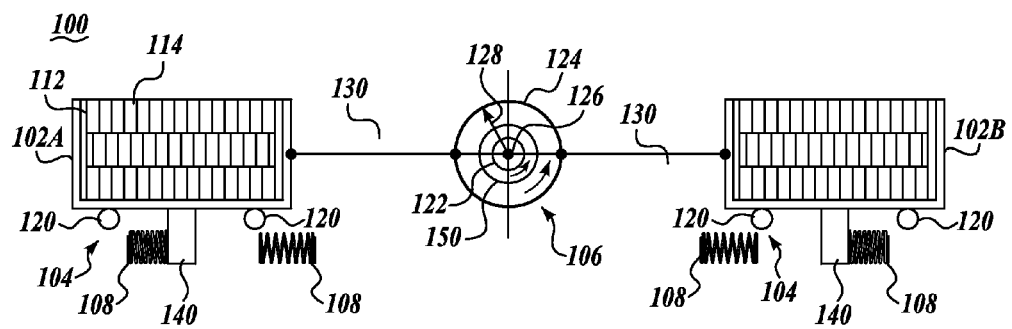
FIG. 3 is a view similar to FIGS. 1-2, but showing the drive actuator system in top dead center and the product carriers at the most distal location of their reciprocal paths.

FIG. 3 shows system 100 in "top dead center" position wherein the crankshaft 124 is shown in maximum throw position, thereby forcing the carriers 102a, 102b to the distal ends of their reciprocal travel paths. At this location, the kinetic energy of the moving, loaded carriers has been converted into potential energy stored in the reaction actuators 108, which are applying their maximum reaction load against the carriers 102a, 102b.

Figure 4:
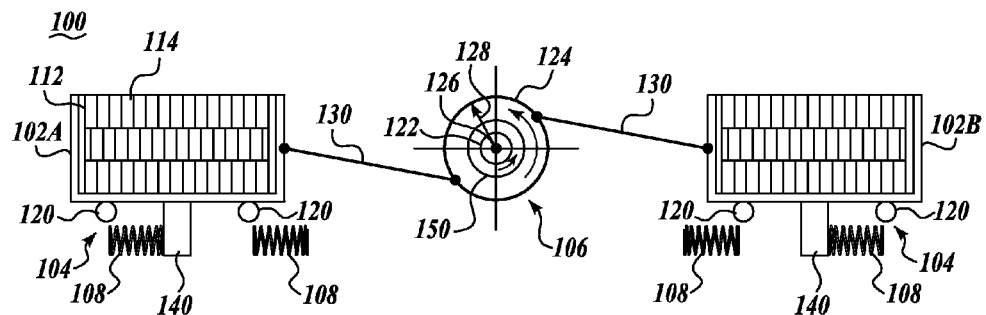
FIG. 4 is a view similar to FIGS. 1-3, but showing the drive actuator system rotated approximately 30° beyond top dead center from the location shown in FIG. 3.

FIG. 4 shows the system 100 somewhat beyond top dead center, wherein the reaction actuators 108 accelerate the carriers 102a, 102b toward the proximal ends of their reciprocal paths by the release of the potential energy that had been accumulated or stored by the reaction actuators. It will be appreciated that the acceleration applied to the carriers 102a, 102b by the reaction actuators 108 causes the crankshaft 124 to rotate faster than the rotational speed of the drive shaft 122, which is possible by the use of the overrunning clutch 150 described above. In essence, the potential energy in the reaction actuators 108 is released and transferred into kinetic energy in the form of the moving masses of the carriers 102a, 102b and baskets/trays 112 carried thereby, which in turn carries the product containers 114.

Figure 5:
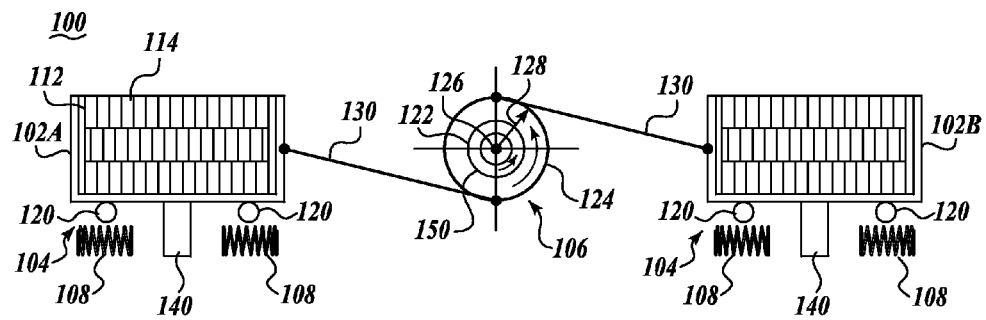
FIG. 5 is a view similar to FIGS. 1-4, but showing the drive actuator system in midpoint location, as well as showing the product carriers in midpoint along their reciprocal travel paths.

When the carriers 102a, 102b are no longer in contact with the reaction actuators 108, as shown in FIG. 5, the carriers are moved at substantially constant speed until they contact the reaction actuators 108 positioned at the opposite ends of the travel paths of the carriers. Realistically, the speed of the carriers will decrease slightly due to the friction of the rollers 120 that support the carriers 102a, 102b.

Figure 6:
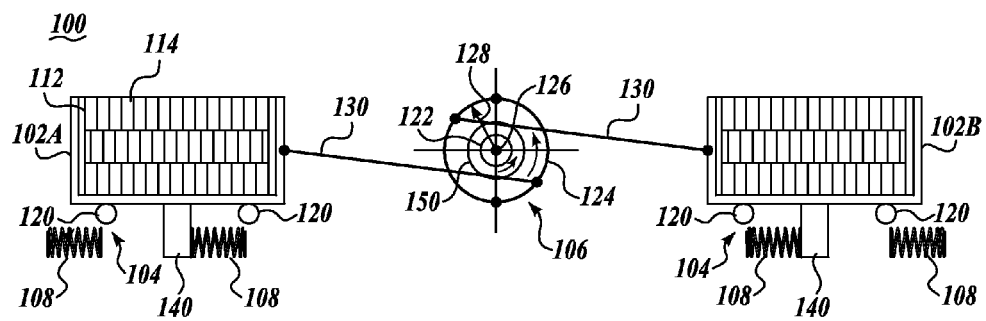
FIG. 6 is a view similar to FIGS. 1-5, but showing the drive actuator system rotated counterclockwise approximately 45° from that shown in FIG. 5.
Figure 7:
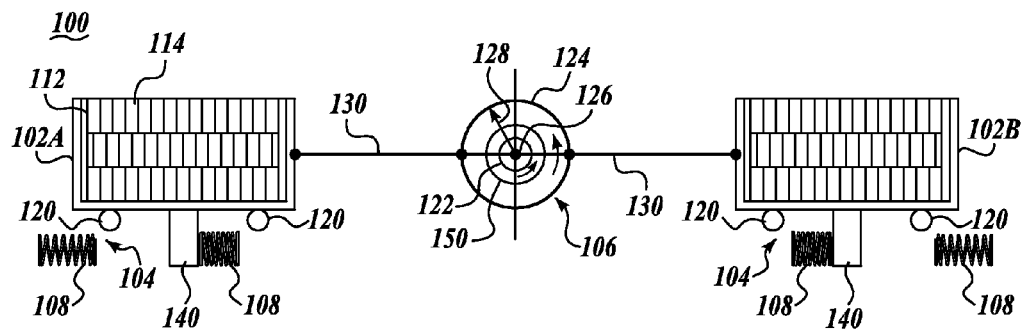
FIG. 7 is a view similar to FIGS. 1-6, but showing the drive actuator system in bottom dead center, wherein the product carriers are positioned at the proximal ends of their travel paths.

As shown in FIG. 6, as the reaction actuators 108 are compressed by the moving carriers 102a, 102b, the speed of the carriers decreases due to the transfer of the kinetic energy of the carriers into the potential energy of the reaction actuators. Also, as the speed of the carriers decreases, the overrunning clutch 150 engages to cause the crankshaft 124 to pull the carriers through bottom dead center, as shown in FIG. 7. In FIG. 7, the crankshaft speed will be the same as the drive shaft speed, since the drive shaft is driving the crankshaft.

Figure 8:
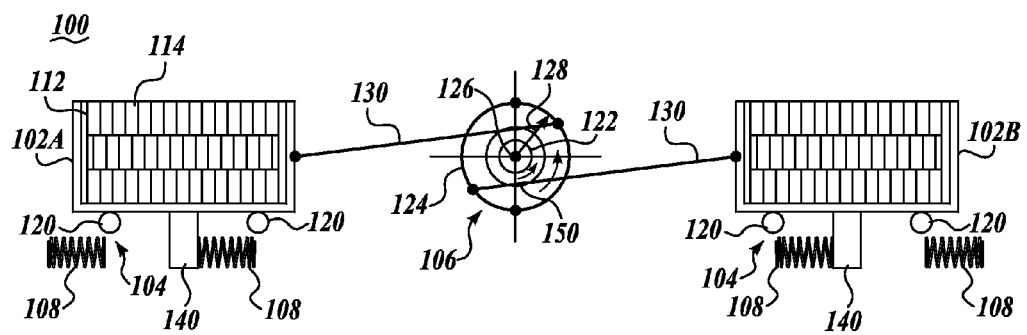
FIG. 8 is a view similar to FIGS. 1-7, but showing the drive actuator system rotated approximately 45° from the position shown in FIG. 8.

Once the crankshaft 124, under the influence of the drive shaft 122, moves beyond bottom dead center, as shown in FIG. 8, the reaction actuators 108 accelerate the carriers 102a, 102b by transferring the potential energy stored up in the reaction actuators into kinetic energy for the accelerating carriers 102a, 102b, thereby moving the carriers in opposite directions, toward the distal end portion of their travel paths. Again, at this point, the crankshaft speed 124 is greater than the drive shaft speed, whereupon the clutch 150 is operating in overrunning mode.

Figure 9:
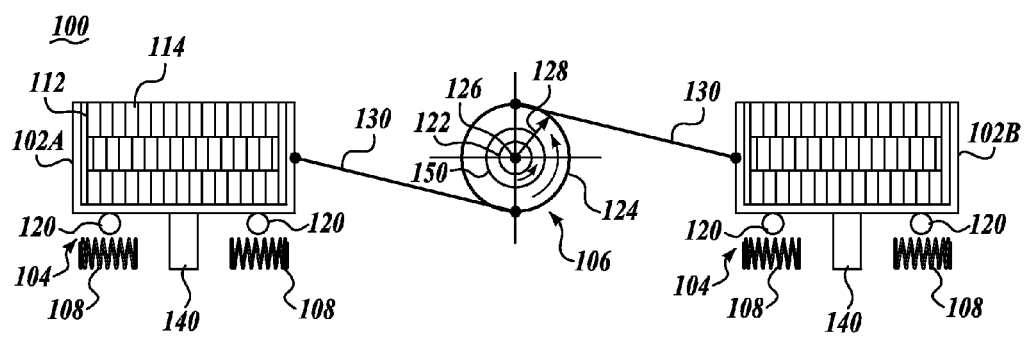
FIG. 9 is a view that is the same as FIG. 1, showing the drive actuator system back at a midpoint location, and showing the product carriers at the midpoint location of their travel path.

FIG. 9 corresponds to FIG. 1 and shows the carriers 102a, 102b again halfway along their reciprocal travel paths, and also shows the crankshaft 124 in mid-point rotation. The above-described cycle is repeated over and over.

It will be appreciated that system 100 results in acceleration/deceleration with the carriers 102a, 102b when the carriers are being acted upon by the reaction actuators. Moreover, it will be appreciated that when the carriers 102a, 102b are not in contact with the reaction actuators, they travel at substantially constant speed, as graphically shown below in FIG. 11.

Figure 11:
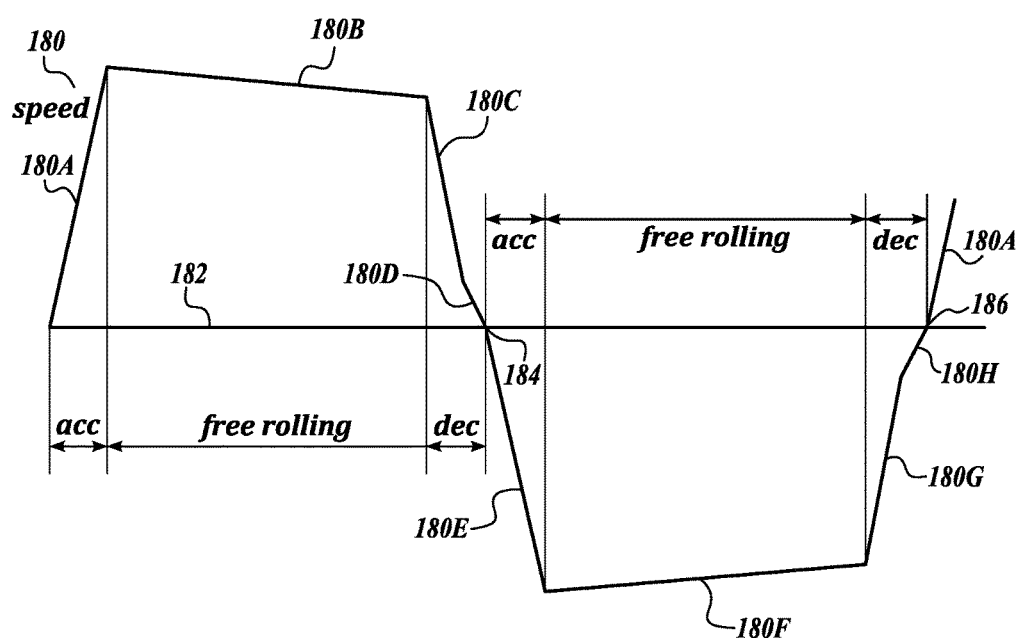
FIG. 11 is a graph showing the speed of the product carriers during their travel cycle.

Line 180 of the graph of FIG. 11 represents the speed of the carriers 102*a*, 102*b* (Y-axis) along their travel paths (X-axis). Different sections of line 180 are identified by an alpha suffix. In this regard, line section 180*a* represents the increase in speed of the carriers caused by the acceleration force supplied thereto by the reaction actuators 108. Line segment 180*b* illustrates the speed of the carriers when beyond the reaction actuators as the carrier travels along the retort in a first direction. Line 182 represents the distance of travel of the carriers or the rotational angle of the crankshaft. Line 180*c* represents the deceleration of the carriers 102 under the influence of the reaction actuators 108 at the opposite end of the travel path of the carriers. This line segment represents the conversion of the kinetic energy of the rapidly moving carriers to potential energy stored in the reaction actuators. Line segment 180*d* represents the portion of the cycle wherein the drive shaft is driving the crankshaft and continuing to move the carrier 102 against the reaction actuator until the crankshaft reaches and passes dead center (represented by crossover point 184), whereupon the carriers 102 start to travel in the opposite direction under the acceleration force of the reaction actuators 108, which is represented by line segment 180*e*. This line segment illustrates the high acceleration of the carriers 102 in the travel direction of the carrier opposite to the travel direction represented by line segments 180*a*, 180*b*, and 180*c*.

Line segment 180*f* represents the travel of the carriers 102 when clear of the reaction actuators 108. As shown by line segment 180*f*, the carriers travel at a substantially uniform speed until the carriers come into contact with the reaction actuators 108 at the opposite end of travel of the carriers, whereupon the carriers quickly decelerates under the reaction force of the reaction actuators, which is represented by line segment 180*g*. When the speed of the carriers 102 have decreased sufficiently under the influence of the reaction actuators, the drive shaft 122 again engages the crankshaft for "carrying" the carriers 102 to the end of their travel paths. This is represented by line segment 180*h*. At crossover point 186, the crankshaft has reached dead center again and the carriers have reached the ends of their travel. Just beyond dead center, as represented by line segment 180*a*, the reaction actuators 108 release their potential energy, to create kinetic energy in the moving carriers 102, causing the carriers to rapidly accelerate. This cycle continues over and over again.

It will be appreciated that the speed of the crankshaft 124 is not constant. As the carriers 102*a*, 102*b* move at a substantially constant speed, the angle of the crankshaft 122 constantly changes. The speed of the crankshaft decreases as the crankshaft rotates to the "upright" positions shown in FIGS. 1, 5, and 9, and then the crankshaft speed increases again as the crankshaft rotates toward the next dead center position, as illustrated in FIGS. 3 and 7.

Figure 12:
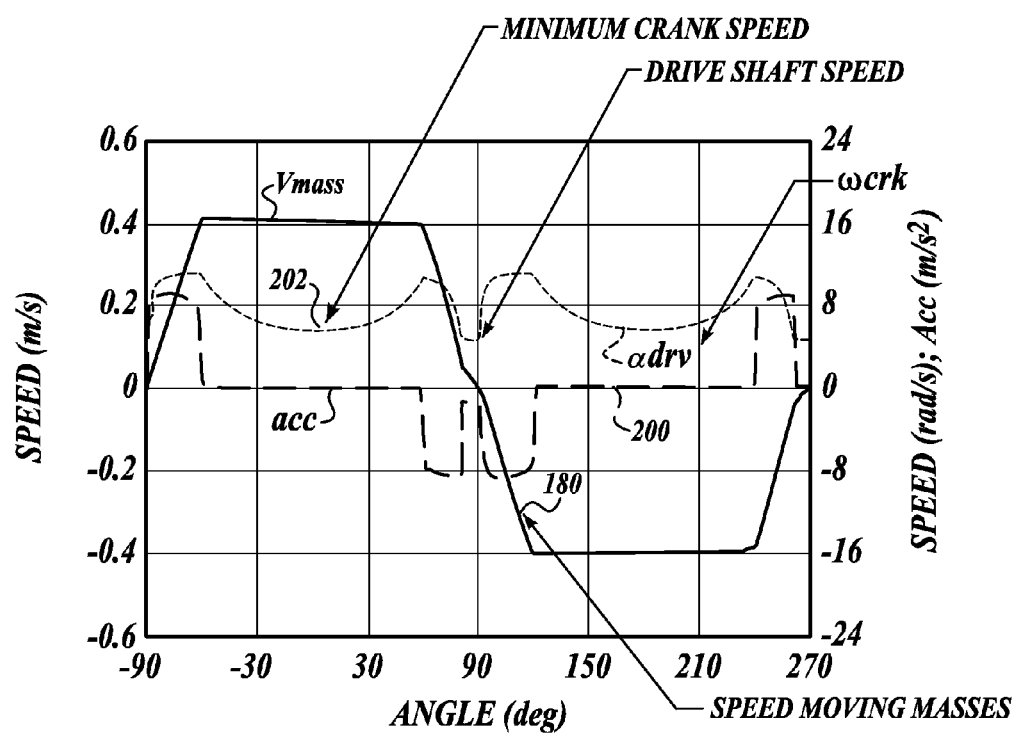
FIG. 12 is a graph showing the speed of the carriers during their travel cycle as well as the rotational speed of the drive shaft and the acceleration and deceleration forces imposed on the carriers during their travel cycle.

In system 100, the speed of the drive shaft 122 dictates the manner in which system 100 operates. If the speed of the drive shaft 122 is less than the minimum speed of the crankshaft 124 in the mid position (for example, as shown in FIGS. 1, 5, and 9), clutch 150 engages toward the top or bottom dead centers of the crankshaft, as the speed of the loaded carriers 102*a*, 102*b* (and the crankshaft) decreases so that the drive shaft carries the crankshaft 122 through the dead center positions. This is shown graphically in FIG. 12. In FIG. 12, the speed of the carriers 102 is shown by line 180. The drive shaft 122 adds energy to the system that was lost due to friction, as potential energy, to the reaction actuators, by completing the final compression or extension of the reaction actuators 108. In FIG. 12, in addition to the line 180 representing the speed of the loaded carriers 102, the line 200 shows the acceleration and deceleration forces applied to the loaded carriers 102 and the line 202 shows the speed of the crankshaft 124.

Figure 13:
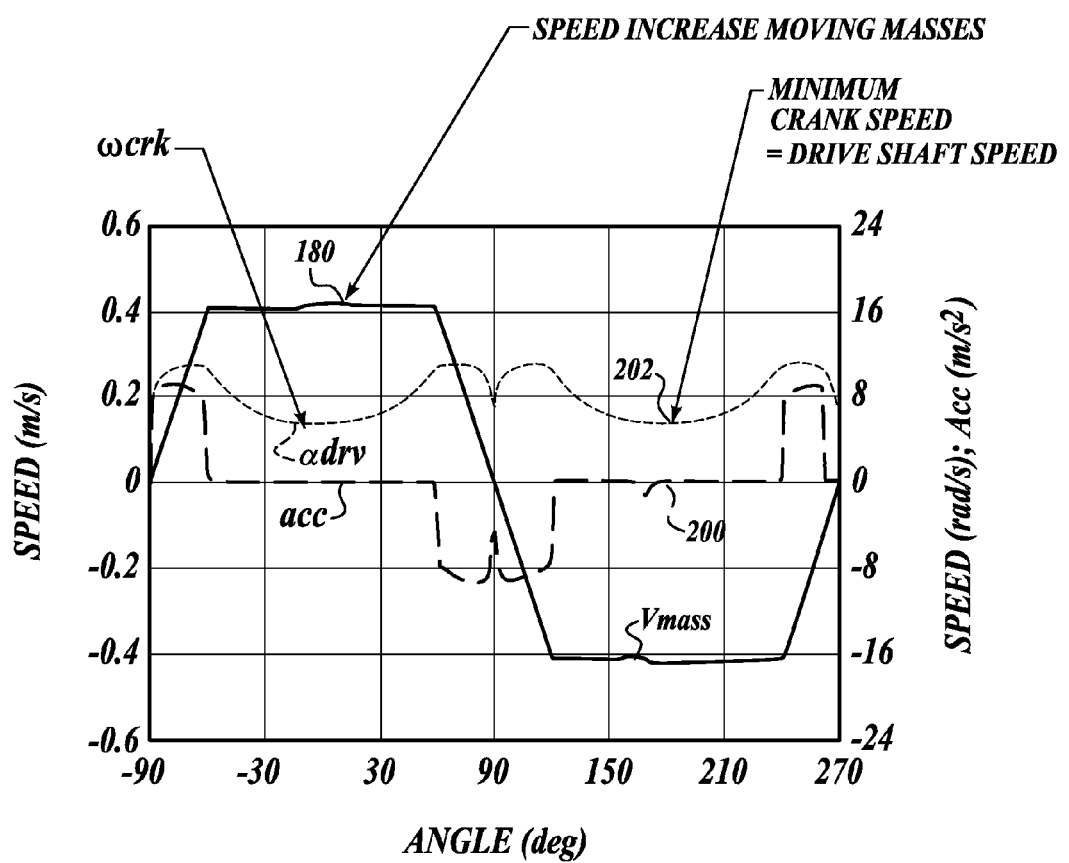
FIG. 13 is a further graph showing a different operating condition of the present system.

On the other hand, if the speed of the drive shaft 122 is higher than the minimum speed of the crankshaft 124 in the mid position of the system 100, as shown in FIGS. 1, 5, and 9, the overrunning clutch 150 will engage the crankshaft before the mid position and thereby increase the linear speed of the loaded carriers 102. The drive shaft 122 adds to the system kinetic energy to compensate for the energy loss due to friction on the rollers 120. The kinetic energy added to the loaded carriers 102 is more than enough to power the carriers through the top and bottom dead center positions of the crankshaft 124 without engagement of the overrun clutch. This situation is shown in FIG. 13. In FIG. 13, the speed of the loaded carriers is shown in line 180. The crankshaft speed is shown by line 202, and the acceleration/deceleration forces imposed of the loaded carriers is shown by line 200.

Figure 14:
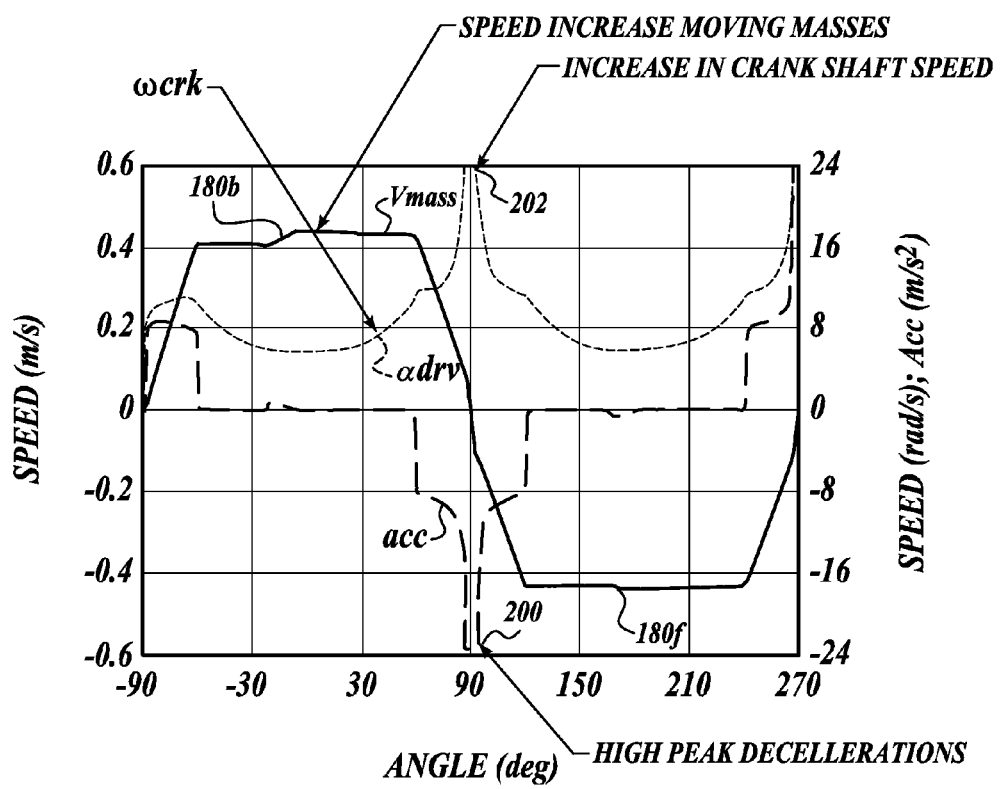
FIG. 14 is a further graph showing a different operating condition of the present system.

In the operation of system 100, it is desirable that the amount of energy added to the system by the drive shaft 122 is not any more than the energy that is lost by friction at rollers 120. If too much energy is added to the moving and loaded carriers 102*a*, 102*b*, their speed will be too high as they approach top dead center or bottom dead center. Because the drive actuator system 106 momentarily stops the travel of the carriers 102*a*, 102*b* at top dead center and bottom dead center, if the carriers are moving at too high a speed, high impact forces are imposed on crankshaft 124, causing high deceleration rates, as shown by line 200 in the graph of FIG. 14. Correspondingly, line 202 in FIG. 14 shows the sharp increase in crankshaft speed occurring as the crankshaft reaches top dead center or bottom dead center, i.e., at the 90° and 270° angles plotted in FIG. 14. FIG. 14 also shows the speed of the carriers as line 180. The lines segments 180*b* and 180*f* in FIG. 14 shows the increase in the speed of the moving mass caused by the energy added to the system by the rotating drive shaft, causing an increase in speed of the moving mass, rather than a gradual decrease in speed of the moving mass, as shown in FIG. 12.

By measuring the speed of the crankshaft 124, a speed control system can be used to optimize the speed of the drive shaft 122 to ensure that the crankshaft speed at top dead center is higher than its minimum speed and lower than the crankshaft speed when the mass of the carriers 102A and 102B first come into contact with the reaction actuators 108.

It will be appreciated that the system 100 results in the very efficient agitation of the food products in the processing retort. The only energy that is needed to be added to the system is the energy lost in rolling friction of the moving carriers. The present system does not necessarily need an external counterbalancing flywheel though in some situations at least a small flywheel may be helpful in smoothing the operation of system 100. Also, the system 100 is capable of generating high deceleration and acceleration toward the ends of the crankshaft stroke only, while the carriers move at an almost constant speed between the ends of their travel paths.

As noted above, the foregoing is accomplished by providing loaded carriers that move in opposite directions when coupled to a crankshaft. At the end of the crankshaft strokes in both directions (180° apart), the carriers compress and otherwise fully load the reaction actuators, whereby when the carriers reach the ends of their travel and thus stop and reverse direction, the kinetic energy of the moving carriers is now stored in the reaction actuators 108 as potential energy. Then, when the crankshaft moves through either top or bottom dead center, the energy stored in the reaction actuators is quickly released, thereby causing high acceleration of the carriers once again, but in the opposite direction. This is repeated at each 180° of rotation of the crankshaft.

Figure 15:
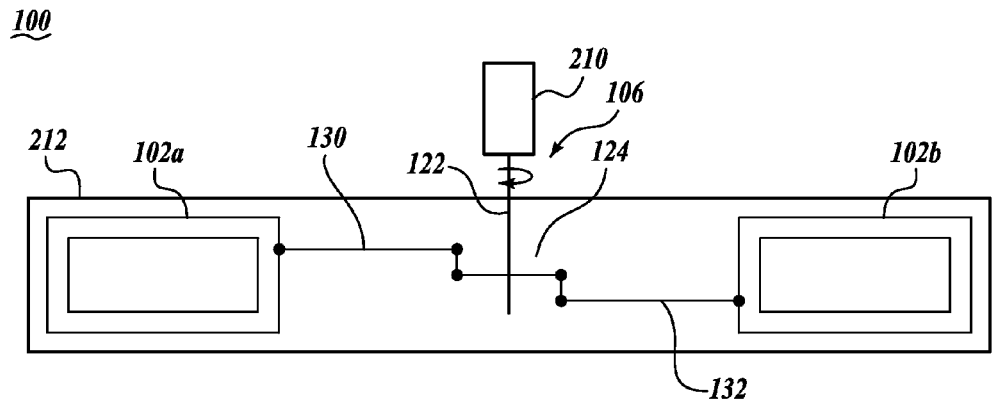
FIG. 15 is a schematic view of one arrangement of product carriers within a retort and the position of the drive actuator system of the present disclosure.

Examples of alterations or changes to the above disclosure of FIGS. 1-14 may include, as noted above, constructing system 100 to be able to change the stroke of the crankshaft 124, as well as other characteristics of the system 100. In this regard, the amount of potential energy stored in the reaction actuators 108 at top dead center or bottom dead center can be varied. Also, the reaction actuators 108 may impose a substantially constant force on the carriers 102, or may be designed to impose an increasing force, or even a decreasing force, on the carriers as the carriers move toward the ends of their travel paths. Further, as noted above, the rotational speed of the drive shaft 122 can be controlled. These control variables enable the system 100 to accommodate different sizes or masses of the products carried by the carriers 102, as well as achieving different levels of agitation desired, for instance, based on the type of food product being processed by system 100. FIGS. 15 through 18 schematically show various positions of the drive actuator system 106 relative to the carriers 102a and 102b. A first example is shown in FIG. 15, wherein portions of the drive actuator system 106, including drive shaft 122 and crankshaft 124 are located within the retort vessel 212 at a position between the carriers 102a and 102b. Connecting links 130 and 132 connect the crankshaft 124 with the carriers 102a and 102b, all located within the vessel 212.

Figure 16:
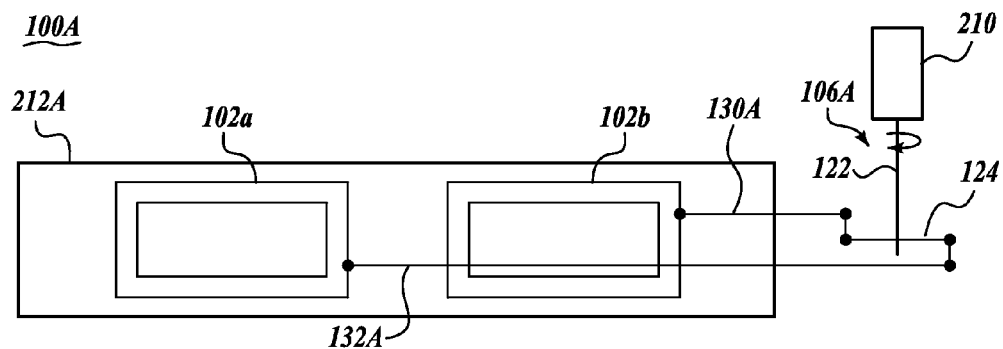
FIG. 16 is a schematic view of another arrangement of product carriers within a retort and the position of the drive actuator system of the present disclosure.

FIG. 16 shows an alternative arrangement wherein a system 100A is constructed so that the drive actuator system 106 is positioned outside of one end of a longitudinal retort 212A. In this regard, the crankshaft 124 and drive motor 210 are also located outside of the retort 212A at the location of the drive actuator system 106A. In this configuration, connecting links 130A and 132A can extend inwardly from the crankshaft 124, through the far end of the retort 212A, to connect to the carriers 102a and 102b located within the retort. Also in this configuration, the crankshaft is not located between the carriers, but rather longitudinally of both carrier sets.

Figure 17:
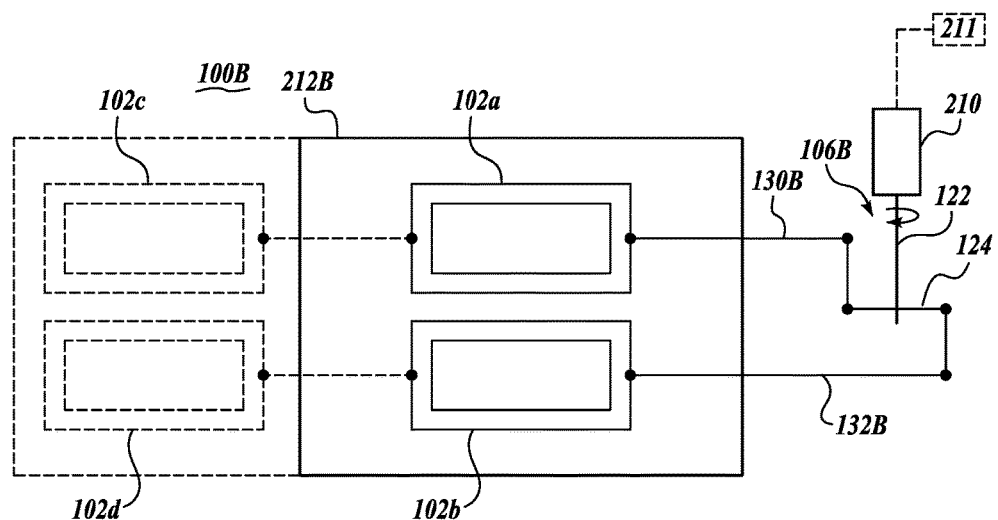
FIG. 17 is a schematic view of another arrangement of product carriers within a retort and the position of the drive actuator system of the present disclosure.

As another alternative, a system 100B can be constructed as shown in FIG. 17 with the carriers 102a and 102b located side by side within a retort vessel 212B. The drive actuator system 106B is positioned outside one end of the "double-wide" retort vessel 212B. In this regard, the crankshaft 124 is also located outside of the retort at the location of the drive actuator system 106B. In this configuration, connecting links 130B and 132B can extend from the crankshaft 124 through the far end of the retort to connect to the adjacent ends of the carriers 102a and 102b, located within the retort. Also, in this configuration, the crankshaft is not located between the carriers 102a and 102b, but rather longitudinally of both carrier sets. Also, a controller 211 is provided for controlling the speed of motor 210 and thus the speed of the drive shaft 122 as well as the level of torque applied to the crankshaft 124. Further, additional product carriers 102c and 102d are linked to the product carriers 102a and 102b, respectively.

Figure 18:
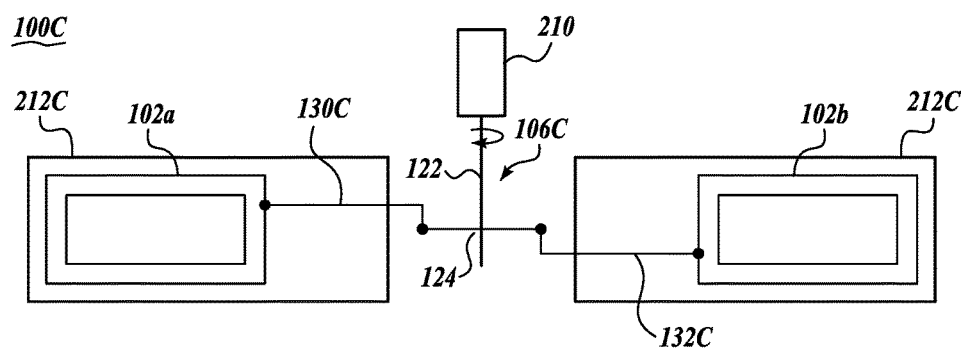
FIG. 18 is a schematic view of another arrangement of product carriers within separate retorts and the position of the drive actuator system of the present disclosure.

As a further variation, a system 100C, shown in FIG. 18, can be designed and constructed so that the drive actuator system 106C including crankshaft 124 and drive motor 210 are located outside of the retort vessels 212C. In this regard, the retort vessels 212C can be constructed as two separate vessels positioned spaced apart end-to-end, with the drive actuator system 106C located between the two vessels. Connecting links 130C and 132C, perhaps similar to connecting links 130 and 132, can be utilized to connect the crankshafts 124 with the carriers 102a and 102b located within the vessels 212C.

Other alternative configurations/arrangements of retort vessels, carrier locations and drive system positions are also contemplated by the present disclosure.

As a further alteration or change, as noted above, several carriers can be connected together to move as a unit, thereby to utilize the full capacity of the retort. As another variation, the system 100 can be constructed with two pallet-type carriers, each capable of receiving several baskets or tray stacks which may be loaded onto the pallet-type carriers for product processing and then removed from the pallet-type carriers after processing has been completed. In this manner, the connecting links, such as connecting links 130 and 132, are permanently attached to the pallet-type carrier, and thus not requiring connection or disconnection with each new batch of products to be processed within the retort. FIGS. 19, 20, 21, 22 and 23 illustrate a further embodiment of the present invention disclosure consisting of a linear reciprocating system 300. System 300 is similar to system 100 as illustrated and described above. The components of system 300 that are the same or very similar to the components of system 100 are identified with the same part numbers but with 300 series. System 300 includes a pair of elongated reciprocating transmission shafts 314 that are disposed within a drive housing 316. The transmission shafts 314 extend outwardly from the distal end of the drive housing 316 to extend into retort vessel 318. The distal ends of the transmission shafts 314 are connectable to carriers (not shown), which may be similar to carriers 102, shown in FIGS. 1-10. The transmission shafts 314 function to reciprocate the carriers in the same manner that product carriers 102 are reciprocated, as generally shown in FIGS. 1-10 and as specifically shown in FIG. 16.

The transmission shafts 314 are powered by a motor 310 located outside of one end of the housing 316. The motor 310 drives a crankshaft 324, which in turn is connected to the ends of connecting links 330. The opposite ends of the connecting links 330 are connected to the transmission shafts 314.

Next, describing system 300 in more detail, the housing 316 is generally rectilinear in shape, and composed of parallel spaced-apart side walls 332 and transverse end walls 334 and 336. Also, top and bottom walls 338 and 340 overlie and underlie the side walls and end walls of the housing. Also, a pair of spaced-apart transverse cross walls 342 and 344 divide the housing into three sections and add structural integrity to the housing. Of course, other configurations of housing 316 are possible.

The transmission shafts 314 are supported within the housing 316 and are retained in parallel alignment within the housing by linear bearings 350, that are disposed within circular or cylindrical seats 352 that project from housing end wall 334 toward the retort vessel 318. At their opposite ends, the transmission shafts 314 are supported by a second set of linear bearings 354 that are retained within cylindrical seats 356 that project from cross wall 344 toward the adjacent end wall 336. As will be appreciated, the transmission shafts 314 slidably reciprocate with low friction within the linear bearings 350 and 354

As noted above, the transmission shafts 314 are powered by the drive motor 310 which is positioned outwardly from of the housing end wall 336, and is disposed generally transversely to the housing and transversely to the lengths of the transmission shafts 314. The motor 310 drives a speed reducer which in turn is coupled to an overrunning clutch 350. The output of the overrunning clutch is turn is coupled to a drive shaft 322 projecting outwardly from the overriding clutch along axis 328. The drive shaft 322 is coupled to crankshaft 324. The drive shaft and crankshaft are supported by bearings 360, which are carried by flanges 362 projecting rearwardly from housing end wall 336. While not shown, an encoder can be provided to monitor the rotation of the drive shaft 322 in a well known manner. In addition, although also not shown, the speed control system can be provided to control the speed of the motor 310.

The ends of connecting links 330 are connected to the crankshaft journals 366 by bearings 368. The opposite ends of the connecting links 330 are connected to slide frames 370a and 370b by spherical bearings 372. Slide frame 370a is attached to a transmission shaft 314 by a cross pin 374 extending through a across cross hole formed in the transmission shaft 314. The cross pin 374 also extends through aligned holes formed in cylindrical collar 376 that projects from the slide frame 370a. Likewise, slide frame 370b is connected to transmission shaft 314 by a cross pin 374 running through a cross hole formed in the transmission shaft 314 and also through aligned of holes formed in a cylindrical collar 378 that projects from the slide frame 370b toward housing distal cross wall 342.

The slide frames 370a and 370b are composed of a pair of lateral members 380 and 382 disposed in spaced-apart parallel relationship to each other. Cylindrical collars 376 and 378 project from the lateral members to receive the transmission shafts 314. In this manner, the slide frame 370a and 370b, move lengthwise within the housing 316 with the movement of the transmission shafts 314. The slide frames 370a and 370b are journaled to the opposite transmission shafts 314 by linear bearings 384 disposed in seats 386 formed in the slide frames 370a and 370b. It will be appreciated that in this matter the slide frames 370a and 370b are maintained in alignment within the housing 316 as the slide frames reciprocate back and forth within the housings.

Figure 19:
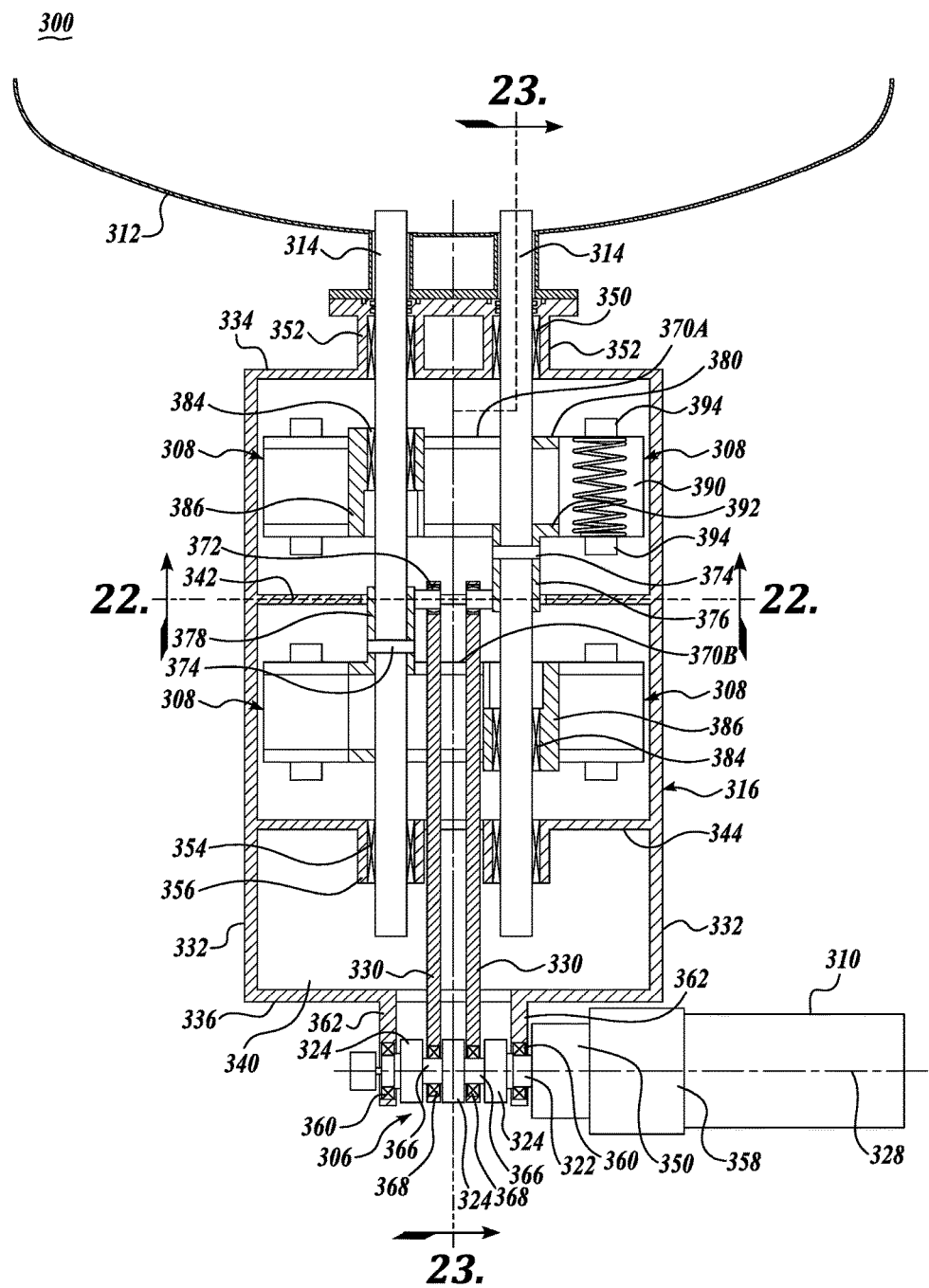
FIG. 19 is a further embodiment of the present disclosure.
Figure 20:
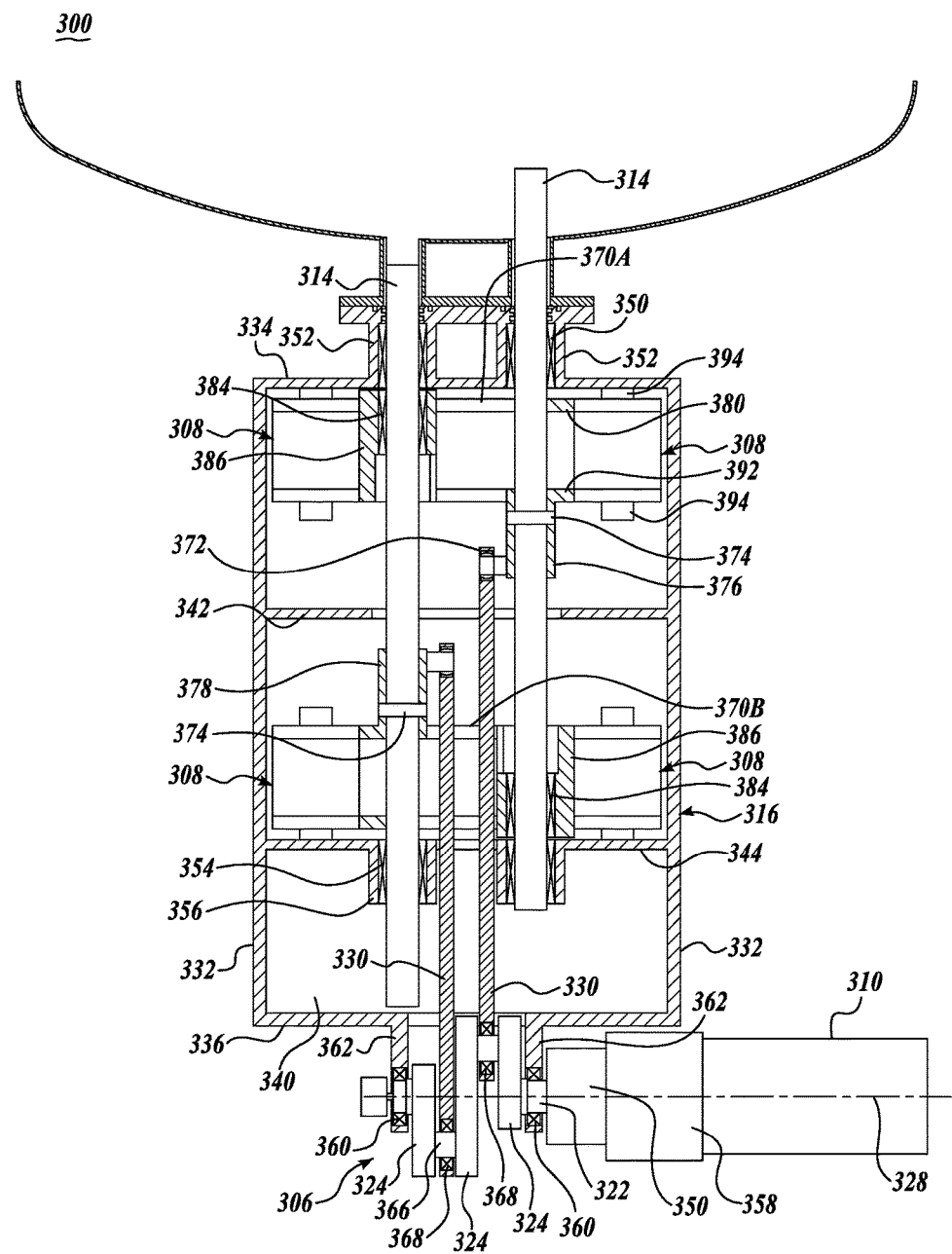
FIG. 20 is a view similar to FIG. 19, but showing the system in one dead center position.
Figure 21:
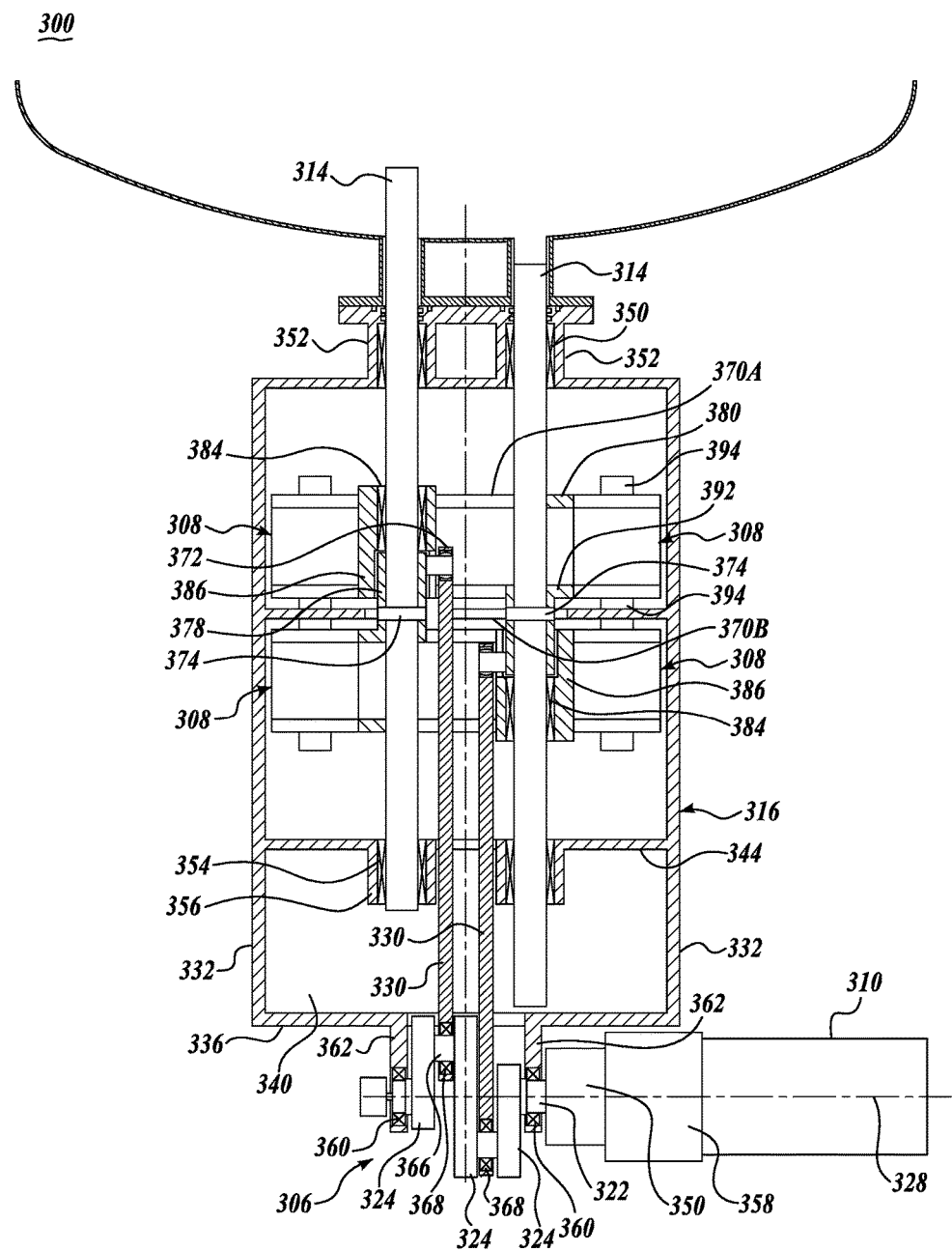
FIG. 21 is a view similar to FIGS. 19 and 20, but showing the system in the opposite dead center location.
Figure 22:
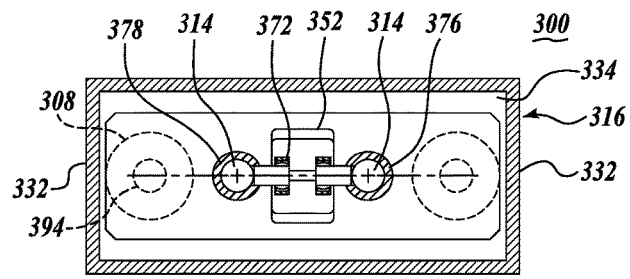
FIG. 22 is a cross-sectional view of FIG. 19 taken along lines A-A thereof.
Figure 23:
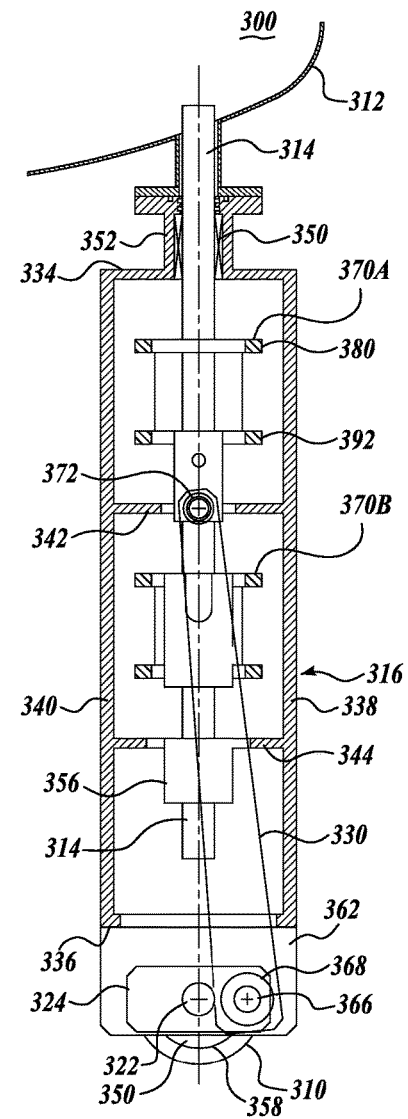
FIG. 23 is a cross-sectional view of FIG. 19 taken along lines B-B thereof.

As shown in FIGS. 19, 20 and 21, reaction actuators 308 are disposed at the lateral ends of the slide frames 370a, 370b. The reaction actuators 308 each include a housing 390 within which are disposed compression springs 392. Bumpers 394 are attached to the opposite ends of the compression springs to extend beyond the ends of the housings 390 of the reaction actuators 308. Compression springs 392 can be preloaded to a desired loading level within the housing 390. As shown in FIGS. 20 and 21, when the transmission shafts 314 reach the ends of their travel, the bumpers 394 bear against the end wall 334 of the housing 316 or against the cross walls 342 and 344 of the housing. In this manner, the reaction actuators are loaded to store the kinetic energy of the moving product carriers and subsequently release the stored energy to impart acceleration forces to the carriers and the transmission shafts 314 in the manner described above in FIGS. 1-10.

Briefly describing the operation of system 300, such system operates essentially the same as system 100 described above. FIG. 19 shows system 300 in an initial position that corresponds to FIGS. 1 and 9 above. In this regard, the slide frames 370a and 370a are shown in intermediate position so that the reaction activators 308 are not engaged. Also, the carriers (not shown) are in intermediate position corresponding to the position of the carriers 102a and 102b in FIGS. 1 and 9.

FIG. 20 shows the system 300 when the crankshaft 324 has been rotated to be in top dead center whereat the right hand transmission shaft 314 is in fully extended position and the left hand transmission shaft 314 is shown in fully retracted position. Accordingly, FIG. 20 can be thought to correspond with FIG. 3 set forth above. In this regard, the reaction activators 308 are in fully compressed position so that the kinetic energy of the moving carriers is now stored in the reaction activators. In this regard, the bumpers 394 of the reaction activators bear against corresponding portions of the housing 316.

FIG. 21 shows the system 300 rotated a further 180° to correspond to FIG. 7 above. In this regard, the extended and retracted positions of the transmission shafts 314 are reversed from those shown in FIG. 20. In the position of the slide frames 370a and 370b shown in FIG. 21, such slide frames are moved to the opposite end of their travel from that shown in FIG. 20. In this regard, the bumpers 94 on the opposite end of the reaction activators 308 are pressed against the housing cross wall 342 whereby the reaction activators are again in fully compressed position whereby the kinetic energy of the moving carriers is stored in the reaction activators. Also, collars 376 and 378 nest in cylindrical seats 386. Once the system moves just beyond the dead center position shown in FIG. 21, the reaction activators operate to accelerate the system so that the carriers then move in the opposite direction under a high acceleration force. This cycle continues with every 360° rotation of the crankshaft 324.

Also as in system 100, system 300 can be controlled by a control system which monitors the speed of the drive shaft 322 and can determine whether the drive shaft speed is appropriate so as to add lost kinetic energy into the system 300 but not add more kinetic energy into the system than actually lost during operation. In this respect and in other respects, the system 300 is capable of operating in the same manner a system 100 described above.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for agitating products in a retort, comprising:
  (a) a first pair of spaced-apart product carriers;
  (b) a low friction support system for supporting the product carriers for movement along the retort;
  (c) a drive actuator system for applying reciprocal forces on the first pair of product carriers in simultaneous opposite directions along the retort; and
  (d) reaction actuators that apply reaction forces against the product carriers in opposition to the movement of the drive actuator system to urge the product carriers for movement along the retort in the direction opposite to the reciprocal movement imposed on the product carriers by the drive actuator system.

2. The system according to claim 1, wherein the drive actuator system comprises:
  a rotary crank drive; and
  connection linkages extending between the rotary crank drive and the product carriers.

3. The system according to claim 2, wherein the rotary crank drive comprises:
  a crankshaft;
  a torque source to apply rotational torque to the crankshaft; and
  an overrunning clutch between the torque source and the crankshaft.

4. The system according to claim 3, further comprising a controller for controlling the speed of the drive actuation system.

5. The system according to claim 1, wherein the product carriers comprise tray structures or basket structures for receiving food product containers.

6. The system according to claim 1, further comprising additional product carriers linked to the product carriers of the first pair.

7. The system according to claim 1, wherein the low friction support system comprises rollers for supporting the product carriers for movement along the retort.

8. The system according to claim 7, wherein said rollers either are (1) axled to the product carriers or (2) carried by the retort and support the product carriers for movement along the retort.

9. The system according to claim 1, wherein the drive actuator system is positioned between the product carriers of the first pair.

10. The system according to claim 1, wherein the drive actuator system is positioned at an end of the first pair of product carriers.

11. The system according to claim 1, wherein the reaction actuators apply either an increasing force or a substantially constant force against the product carrier as the product carriers travel to the ends of their reciprocal paths of travel.

12. The system according to claim 1, wherein the reaction actuators are selected from the group consisting of compression springs, extension springs, torsion springs, coil springs, helical springs, gas springs, and pneumatic springs.

13. The system according to claim 1, wherein the reaction actuators comprise a singular reaction actuator that applies a reaction force against the product carriers and both ends of the travel paths of the product carriers.

14. A method of agitating products in a retort, comprising:
(a) arranging the products in two sets for movement along the retort;
(b) applying reciprocating forces on two spaced-apart product sets for reciprocating movement of the product sets in opposite directions relative to each other along the retort; and
(c) applying reaction forces to the product sets for moving the product sets in a direction opposite to the direction of movement of the product sets under the influence of the reciprocating forces.

15. The method of claim 14, wherein:
(a) the product sets move along reciprocal paths between a proximal location and a distal location; and
(b) the reaction forces act on the product sets in a direction opposite to the direction of movement of the product sets under the influence of the reciprocating force as the product sets reach the proximal locations and the distal locations along the reciprocal travel path.

16. The method of claim 14, wherein the reciprocating forces are applied to the product sets from a location between the product sets or from a location at an end of the two product sets.

17. The method of claim 14, wherein the reciprocal forces are applied to the product sets by a rotational crank drive system.

18. The method of claim 17, wherein the crank drive system comprises an overrunning clutch system to permit the product sets to move under the influence of the reaction force at a speed faster than the speed of movement of the product sets acting under the reciprocal force applied to the product sets by the rotatable crank drive system.

19. The method of claim 14, further providing a low-friction support for the product sets during reciprocal movement of the product sets along the retort.

20. The method of claim 15, wherein the reaction forces applied to the product sets are either substantially constant forces or an increasing force as the products sets move towards the ends of their respective paths of travel.

21. The method of claim 14, further comprising connecting one or more additional product sets to each of the two product sets, said additional product sets moving in reciprocating motion along the retort with the corresponding spaced-apart product set to which the additional one or more product sets are connected.

22. The method of claim 14, further comprising controlling the speed at which the reciprocating forces are applied to the product sets.

* * * * *